(12) United States Patent
Rath et al.

(10) Patent No.: US 10,567,277 B2
(45) Date of Patent: Feb. 18, 2020

(54) METHOD AND SYSTEM FOR CO-OPERATIVE ON-PATH AND OFF-PATH CACHING POLICY FOR INFORMATION CENTRIC NETWORKS

(71) Applicant: Tata Consultancy Services Limited, Mumbai (IN)

(72) Inventors: Hemant Kumar Rath, Bangalore (IN); Bighnaraj Panigrahi, Bangalore (IN); Anantha Simha, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 189 days.

(21) Appl. No.: 15/423,228

(22) Filed: Feb. 2, 2017

(65) Prior Publication Data

US 2017/0237657 A1 Aug. 17, 2017
US 2017/0346735 A9 Nov. 30, 2017

(30) Foreign Application Priority Data

Jan. 15, 2016 (IN) .............................. 201621001593

(51) Int. Cl.
*G06F 15/173* (2006.01)
*H04L 12/725* (2013.01)
(Continued)

(52) U.S. Cl.
CPC ............ *H04L 45/306* (2013.01); *H04L 45/38* (2013.01); *H04L 67/1097* (2013.01); *H04L 67/2842* (2013.01)

(58) Field of Classification Search
CPC ... H04L 45/306; H04L 45/742; H04L 47/808; H04L 45/38; H04L 45/60; H04L 67/1097; H04L 67/327; H04L 67/2852
(Continued)

(56) References Cited

U.S. PATENT DOCUMENTS

2005/0055511 A1* 3/2005 Schreter ................ G06F 12/123
711/134
2009/0198790 A1* 8/2009 Grevers, Jr. ........ H04L 67/2842
709/213
(Continued)

OTHER PUBLICATIONS

Long et al. , "Off-Path and On-Path Collaborative Caching in Named Data Network", Aug. 20, 2012, AsiaFI 2012 (Year: 2012).*
(Continued)

*Primary Examiner* — Dustin Nguyen
*Assistant Examiner* — Hao H Nguyen
(74) *Attorney, Agent, or Firm* — Finnegan, Henderson, Farabow, Garrett & Dunner LLP (57) ABSTRACT

A method and a system is disclosed herein for co-operative on-path and off-path caching policy for information centric networks (ICN). In an embodiment, a computer implemented method and system is provided for cooperative on-path and off-path caching policy for information centric networks in which the edge routers or on-path routers optimally store the requested ICN contents and are supported by a strategically placed central off-path cache router for additional level of caching. A heuristic mechanism has also been provided to offload and to optimally store the contents from the on-path routers to off-path central cache router. The present scheme optimally stores the requested ICN contents either in the on-path edge routers or in strategically located off-path central cache router. The present scheme also ensures optimal formulation resulting in reduced cache duplication, delay and network usage.

11 Claims, 9 Drawing Sheets

(51) Int. Cl.
*H04L 29/08* (2006.01)
*H04L 12/721* (2013.01)

(58) Field of Classification Search
USPC ....... 709/202, 203, 204, 213, 216, 217, 219, 709/224, 238, 240, 246; 711/111, 134, 711/135, 136, 144, 167
See application file for complete search history.

(56) References Cited

U.S. PATENT DOCUMENTS

| | | | | |
|---|---|---|---|---|
| 2013/0046883 A1* | 2/2013 | Lientz | ................. | H04L 41/0816 709/224 |
| 2013/0204961 A1* | 8/2013 | Fliam | ................. | H04L 67/2885 709/214 |
| 2014/0067913 A1* | 3/2014 | von Haden | ......... | H04L 67/2852 709/203 |
| 2014/0095804 A1* | 4/2014 | Lientz | .................... | H04L 67/06 711/144 |
| 2014/0173018 A1* | 6/2014 | Westphal | ............ | H04L 41/0823 709/213 |
| 2014/0189060 A1* | 7/2014 | Westphal | .......... | H04W 36/0016 709/217 |
| 2014/0201258 A1* | 7/2014 | Jowett | .................... | H04L 67/02 709/203 |
| 2014/0280454 A1* | 9/2014 | Medard | ............... | H04L 67/2852 709/202 |
| 2015/0039784 A1* | 2/2015 | Westphal | ............. | H04L 45/306 709/240 |
| 2016/0014215 A1 | 1/2016 | Oran et al. | | |
| 2016/0036730 A1* | 2/2016 | Kutscher | ................ | H04L 45/38 370/401 |
| 2016/0173604 A1* | 6/2016 | Panigrahi | ........... | H04L 67/1097 709/216 |
| 2016/0234333 A1* | 8/2016 | Yeh | ....................... | H04L 45/586 |
| 2017/0093714 A1* | 3/2017 | Liu | ....................... | H04L 45/745 |

OTHER PUBLICATIONS

Saino et al., "Hash-routing Schemes for Information Centric Networking", ICN '13 Proceedings of the 3rd ACM SIGCOMM workshop on Information-centric networking, ACM, Inc , 6 pages, (2013) Link: https://lorenzosaino.github.io/publications/hashrouting-icn13.pdf.

* cited by examiner

METHOD AND SYSTEM FOR CO-OPERATIVE ON-PATH AND OFF-PATH CACHING POLICY FOR INFORMATION CENTRIC NETWORKS

PRIORITY CLAIM

This U.S. patent application claims priority under 35 U.S.C. § 119 to India Application Serial No. 201621001593, filed on Jan. 15, 2016. The entire contents of the aforementioned application are incorporated herein by reference.

TECHNICAL FIELD

The present subject matter described herein, in general, relates to Information Centric Networks (ICN). Particularly, the application provides a method and system for cooperative on-path and off-path caching policy for information centric networks.

BACKGROUND

Caching in Information Centric Networks (ICN) is an emerging area of research. Existing prior art provides a detailed description of ICN including current and future research directions on various challenges of ICN such as architecture, naming, caching, security, etc. while certain other existing prior arts speak about on-path caching and off-path caching on a broad level.

In an existing prior art, authors have proposed to use on-path caching with Least Recently Used (LRU) as the cache replacement policy, while another prior art proposes a Least Valuable First (LVF) policy employing a utility function that uses delay, popularity, and age parameters to determine the cached item to be replaced. It maximizes user gain according to a delay limit, thereby ensuring delay profile to the users. It is a sub-optimal policy and does not explain the nature of the requests entering to the router. A universal on-path caching in which a content metric based caching and cache replacement policy is used for optimal network gain has also been discussed and characterization of the requests and optimal cache size of the ICN router to ensure a desired cache hit performance has been proposed too.

It has been observed in existing prior art that strategic location of the on-path cached routers are even more important than an efficient cache replacement policy. While most of the existing research have intended to improve the latency and the overall network efficiency, using storage efficiency of the cache space for on-path caching has also been proposed.

Contrary to on-path caching, off-path caching saves the contents in a strategic location to improve overall network usage and avoid cache duplication. Existing art proposes an off-path caching scheme using the concept of Software Defined Networks (SDN). It mainly aims to measure the popularity index associated with each content and based on that it caches at a strategic location, while ensuring low overhead.

Prior art also proposes a joint scheme in which Least Recently Used (LRU) is used for on-path caching in addition to off-path caching, such that redundant caching of data items are avoided. However LRU is used in ICN, the scheme is not optimal. Further, prior art has also proposed using indirect routing or traffic deflection such that all requests for a particular content traverse through a particular path. So, in addition to scalability issues, characterizing the requests at the beginning and then defining a route does not lead to an optimal solution.

Caching as an optimization problem has also been investigated in numerous ways. Existing art has proposed a formal framework of cache allocation models in ICN and used this framework to compare the performance of the scheme. It further explains the need of caching at a router near the user, while using Mixed-Integer Linear Programming to formulate on-path caching. Distance of the source as a factor has been discussed while modelling the optimization problem. Furthermore, an optimal scheme in which replication of information inside the network is minimized has been proposed where using four on-line intra-domain cache management algorithms with different level of automaticity and comparing them with respect to performance, complexity, execution time, and message exchange overhead have been suggested.

From the existing art discussed, it can be clearly observed that an optimal caching policy is still required for an ICN network while ensuring minimal duplication of cached content.

Accordingly, the present system and method describes static analysis-based efficient elimination of one or more false positives from static analysis warnings generated during the property verification.

OBJECTIVES

In accordance with the present disclosure, an objective of the disclosure is to provide a method and system for cooperative on-path and off-path caching policy for information centric networks (ICN).

Another objective of the disclosure is to provide an optimal co-operative caching policy which can be used in campus level or ISP level ICN caching design and management.

Yet another objective of the disclosure is to provide a method for improving the performance of the network in terms of network usage and delay at both local (on-path edge routers) as well as at a global (ISP or campus-wide) level.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system and a method to improve network performance by co-operative caching content in a multi-router information centric network (ICN) architecture.

In one aspect, a computer implemented method to improve network performance by co-operative caching content in a multi-router information centric network (ICN) architecture, wherein the method comprising on-path caching and off-path caching. In the on-path caching a plurality of edge routers of a multi-router network cache an incoming content from a source router in the return path while the content is being served to an user of the multi-router network and in the off-path caching a predefined central router of the multi-router network caches one or more un-cached contents and one or more filtered out staled contents of each of the plurality of edge routers. Further, the plurality of edge routers of the multi-router network are assisted by the pre-defined central router of the multi-router network and the incoming content cached at atleast one of the plurality of edge routers of the multi-router network is based on availability of cache of the edge router. Furthermore, the method comprising computing score of the incoming content to cache at each of the plurality of edge routers of the multi-router network, wherein the computed score is used to tag cache lifetime of the content and replacing stale cached content of the at least one of the plurality of edge routers, wherein the replacement is based on the lower cache lifetime of the staled cache and incoming content.

In another aspect, a system for improving network performance by co-operative caching content in a multi-router information centric network (ICN) architecture. The system comprising a plurality of edge routers of the multi-router network, a central router of the multi-router network, an ICN manager and/or ICN resolver and at least one router of a multi-router network is a source of a plurality of contents and an end user, wherein the end user is communicatively coupled with multi-router network over the ICN. Further, the plurality of edge routers, the central router and the at least one source router of multi-router network is configured to perform the steps of on-path caching and off-path caching. In the on-path caching a plurality of edge routers of a multi-router network cache an incoming content from a source router in the return path while the content is being served to an user of the multi-router network and in the off-path caching a predefined central router of the multi-router network caches one or more un-cached contents and one or more filtered out staled contents of each of the plurality of edge routers. Further, the plurality of edge routers of the multi-router network are assisted by the pre-defined central router of the multi-router network and the incoming content cached at at least one of the plurality of edge routers of the multi-router network is based on availability of cache of the edge router. In addition to, the system is configured to compute score of the incoming content to cache at each of the plurality of edge routers of the multi-router network, wherein the computed score is used to tag cache lifetime of the content and replacing stale cached content of the atleast one of the plurality of edge routers, wherein the replacement is based on the lower cache lifetime of the staled cache and incoming content.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present disclosure relates to a computer implemented method and system for cooperative on-path and off-path caching policy for information centric networks (ICN) which can be used for improving the performance of the network in terms of network usage and delay at both local (on-path edge routers) as well as at a global (ISP or campus-wide) level.

Figure 1:
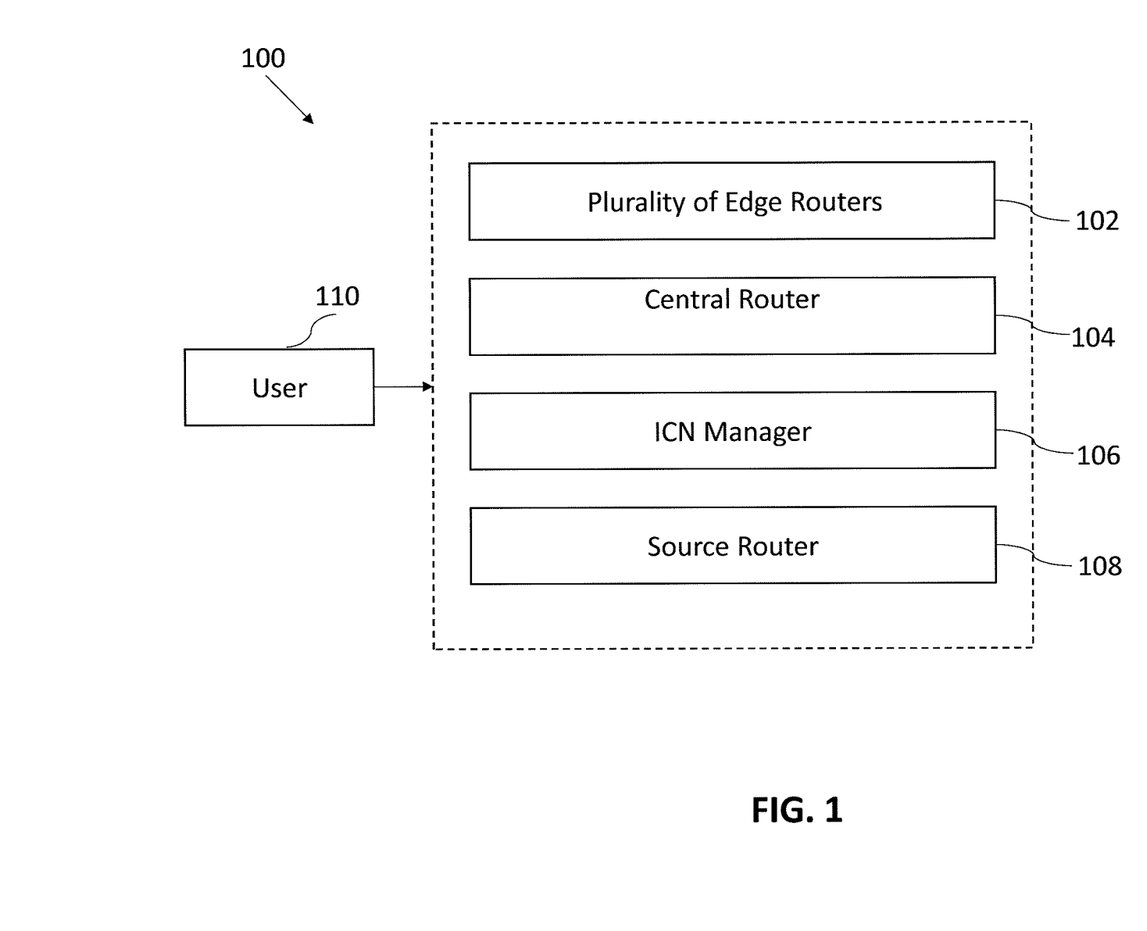
FIG. 1 illustrates a system for improving network performance by co-operative caching content in a multi-router information centric network (ICN) architecture according to an embodiment of the present disclosure.

A system 100 for improving network performance by co-operative caching content in a multi-router information centric network (ICN) architecture. The system comprising a plurality of edge routers of the multi-router network 102, a central router of the multi-router network 104, an ICN manager and/or ICN resolver 106 and at least one router of a multi-router network is a source of a plurality of contents 108 and an end user 110, wherein the end user is communicatively coupled with multi-router network over the ICN.

ICN envisions a radical shift from existing host-centric networking of the Internet to a content centric networking. Caching is an important and integral part of ICN. In ICN, the requested contents that are downloaded from the original source are stored at intermediate on-path routers. However, with increase in similarity in the requests between the edge routers, cache redundancy occurs at the edge routers leading to decrease in network performance.

In the preferred embodiment, an overlay ICN architecture in which the users' requests for contents are resolved by an ICN Manager is considered. Next, an end-to-end reverse path between the source and the user is created by the ICN Manager. It is to be noted that the source can be the original producer server or any other cache router where the data is currently cached. In the downloading on-path of the content, each intermediate ICN router may cache it in its internal cache. Apart from this, the contents can also be cached in near-by strategically located off-path caches. Once the content is cached by the routers, ICN Manager is to be updated so that the ICN Manager keeps track of the sources to resolve future requests. Based on the updated information, the future requests for the same content can be directed to the corresponding ICN routers for delivery.

Figure 2:
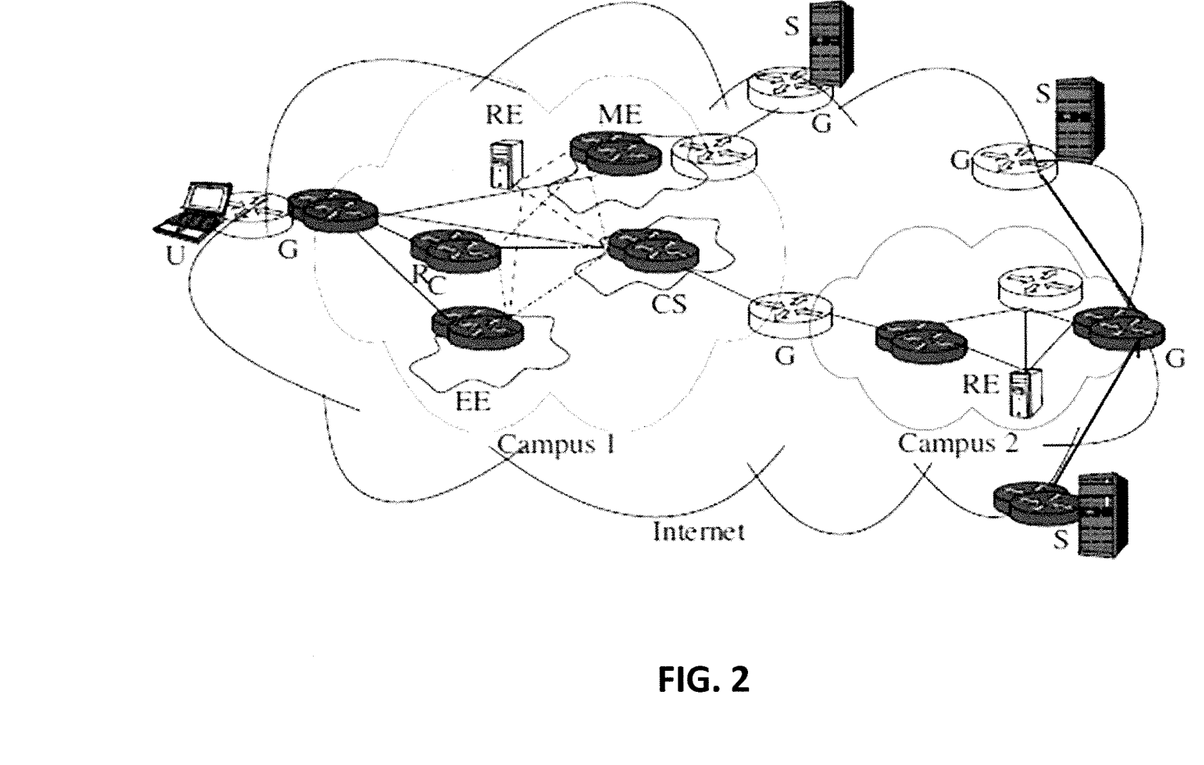
FIG. 2 illustrates an Information Centric Networks (ICN) topology according to an embodiment of the present disclosure.

In an example, as illustrated in FIG. 2, a network with two different campuses which are considered to be of smaller versions of ISP networks. Campuses are divided into various sub-networks (equivalent to zones or sub-zones under ISP network) in a department-wide fashion; viz., in Campus 1, there are three departments, EE: Electrical Engineering, CS: Computer Science and ME: Mechanical Engineering. Each sub/department-network is having a local ICN router to serve the requests initiated by the users associated to it. The department ICN routers are connected with each other either in a mesh or Local Area Network (LAN) or in a Wide Area Network (WAN) fashion and are relatively low-end ICN routers in terms of processing power and caching capacity. Each Campus is equipped with a Resolver (RE) and a central high-end ICN router (RC) which can cache the contents in an off-path or off-line fashion. Multiple campuses can be inter-connected through border-gateway(s) (G). It is to be noted that operation wise, the central router 'RC' is different from the edge routers as it does not store any on-path downloaded contents directly and stores contents that are forwarded from the edge routers for offloading purpose only. The terms ICN Manager and name resolver has been used interchangeably hereinafter.

In the preferred embodiment, the plurality of edge routers, the predefined central router and the at least one source router of multi-router network are comprising the steps of on-path caching and off-path caching. In the on-path caching the plurality of edge routers cache an incoming content from a source router in the return path while the content is being served to the user of the multi-router network. In the off-path caching the predefined central router of the multi-router network caches one or more un-cached contents and one or more filtered out staled contents of each of the plurality of edge routers. Herein the plurality of edge routers are assisted by the predefined central router and the incoming content can be cached at atleast one of the plurality of edge routers based on availability of cache of the edge routers.

Figure 3:
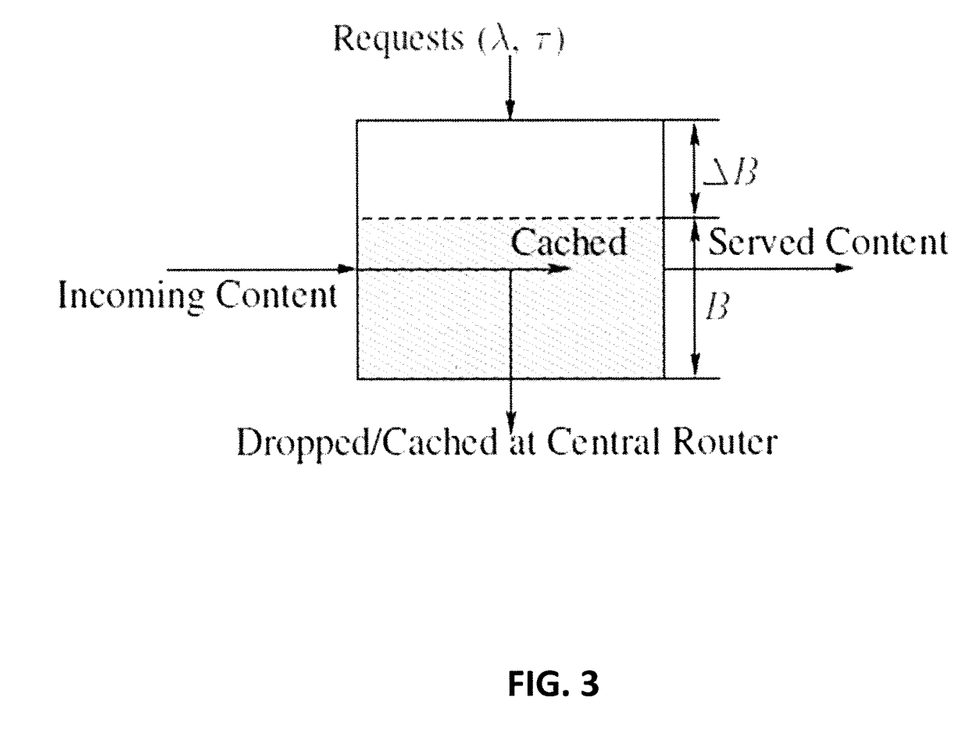
FIG. 3 illustrates the functionalities of an Information Centric Networks (ICN) router according to an embodiment of the present disclosure.

In another example, as illustrated in FIG. 3, let the finite cache size at any ICN router i be $B_i$. Let $\lambda_i$ be the average rate of requests at router i. On receiving a request for a content from any of the users, router i first checks in its local cache. If the content is available, then it serves the content immediately. In case of a cache miss for the content, router i forwards the request to the ICN Manager which performs name resolution. Next, the request to the source of the content is forwarded by the ICN Manager; serving source can be the original source of the content or a nearest router which has the requested content in its cache. While serving the contents passing through it from the source to the user, any intermediate ICN router (including router i) can cache the content subject to availability of cache. If the cache is full, router i needs to replace low priority older contents with the incoming high priority ones. After either caching or cache replacement, ICN router updates the ICN Manager such that future requests can be forwarded to the specific routers for content delivery. In order to have an intelligent caching mechanism, router i also needs to characterize the incoming requests. Let $T_i$ be the diversity index of the requests at router i, expressed as:

$$T_i = \frac{H(X)}{\log_2(\lambda_i)}, \quad (1)$$

where $H(x)$ is the entropy of the incoming requests X and $\log_2(\lambda_i)$ is the maximum entropy of requests; $0 \leq T_i \leq 1$; $T_i = 0$: all the requests are identical and $T_i = 1$: all the requests are distinct. To characterize the requests X, the time axis is discretized with a sample period of $\Delta t$ time units. With finite cache size and large number of contents in the network, while storing, each content is attached with a cache lifetime tag by the ICN router. If the content remains un-accessed within its lifetime, then it is discarded from the cache and the status is updated to the ICN Manager. This further ensures room for the future requested contents. A fixed cache lifetime is assumed and each router while serving requests, need to intelligently decide whether to cache the requested content or not. In the process, it has to identify the cached contents which can be replaced to provide room for the new in-coming contents. For the optimal decision, each router i should ensure caching of contents which can lead to minimum delay to serve and maximum probability of cache hit. This is equivalent to solving the following optimization problem at each router i.

$$\max E[p_i], \quad (2)$$
$$\min E[d_i],$$
$$\text{s.t.}$$
$$\Delta B_i \geq 0.$$

This is a multi-objective optimization problem, where $E[p_i]$ is the average probability of hit that the ICN router experiences while serving the requests, $E[d_i]$ is the average end-to-end delay being observed while serving the requests, and $\Delta B_i$ is the available cache size at any time instant t. The end-to-end delay experienced by the ICN router is a function of cache search time, name resolution time at the ICN Manager, and end-to-end packet transmission time which in-turn is a function of the number of hops the content is traversed through. Out of these three parameters, cache search time and end-to-end transmission time can be controlled by the ICN router; by implementing better cache search algorithms and keeping the requested content in its own cache or at a near-by router. The third parameter, i.e., name resolution time at the ICN Manager depends upon the name size and network size, which are independent of the caching policy at the ICN router.

In another embodiment, the system comprising means for computing score of the incoming content to cache at each of the plurality of edge routers of the multi-router network and means for replacing stale cached content of the atleast one of the plurality of edge routers. The computed score is used to tag cache lifetime of the content.

Each ICN router stores the contents which are frequently asked by the users. This can improve the cache hit probability E[p-951345937 i]. Further to minimize transmission delay, each router should cache the contents which are being served from a distant source, i.e., assign weightage according to the number of hop distance to the source. To avoid starvation of newly arrived contents with lower frequency of access, cache lifetime is used. Therefore, stale cached contents are flushed out, if they are not accessed for a time T, without impacting the objective of Equation 2.

Based on the above mechanism, each on-path edge router computes a content Caching Score CS(k) for each incoming content k using the following formula and compares this with the scores of the existing contents in its cache for replacement, in case the cache is full, i.e., ΔB-951345936 i=0, $$CS_i(k) = c_1 \times D_i(k) + c_2 \times F_i(k), \quad (3)$$

Where D-951345936 i(k) is the normalized distance in terms of hop counts between the source and serving router i (normalized with maximum count possible) which can be obtained with the help of the Time-to-Live (TTL) value associated with the data packet if Internet Protocol (IP) stack is used. Something similar to TTL can also be used in case IP stack is not used by the ICN architecture. F-951345933 i(k) is the normalized frequency of access of the content (normalized with the maximum frequency F-951345933 Max of access of cached contents) and c-951345933 1, c-951345933 2 are constants. If a cached content is served, then D-951345932 i(k)=0 and $$F_i(k) = F_i(k) + \frac{1}{F_{Max}}$$

If a new content (not cached) is served, then $$F_i(k) = \frac{1}{F_{Max}} \text{ and } D_i(k)$$

and D-951345932 i(k) is the normalized hop count for this content.

In a multi-router network as illustrated in FIG. 2, multiple routers solve Eq. (2) independently for intelligent caching. Since this is a multi-objective optimization problem, the disclosure proposes to relax one objective out of the two, such that a practical solutions can be obtained. The system comprises the central cache router which can be placed strategically in the network. The new contents fetched from the source but unable to get cached at the on-path edge routers or the contents which are getting replaced at the edge routers due to lower CS value can be cached at the central cache using off-path caching. Hence, Eq. (2) can be re-written as:

$$\max E[p_i], \quad (4)$$

s.t.

$$E[d_i] \leq \delta,$$

$$\Delta B_i \geq 0,$$

Where δ is the delay threshold which needs to be maintained as a part of the Service Level Agreement (SLA) by the operator. It is to be noted that Eq. (4) is a form of Eq. (2), where the second objective is transformed to a constraint with the help of the new central router. This gives flexibility in solving the optimization problem.

Figure 5:
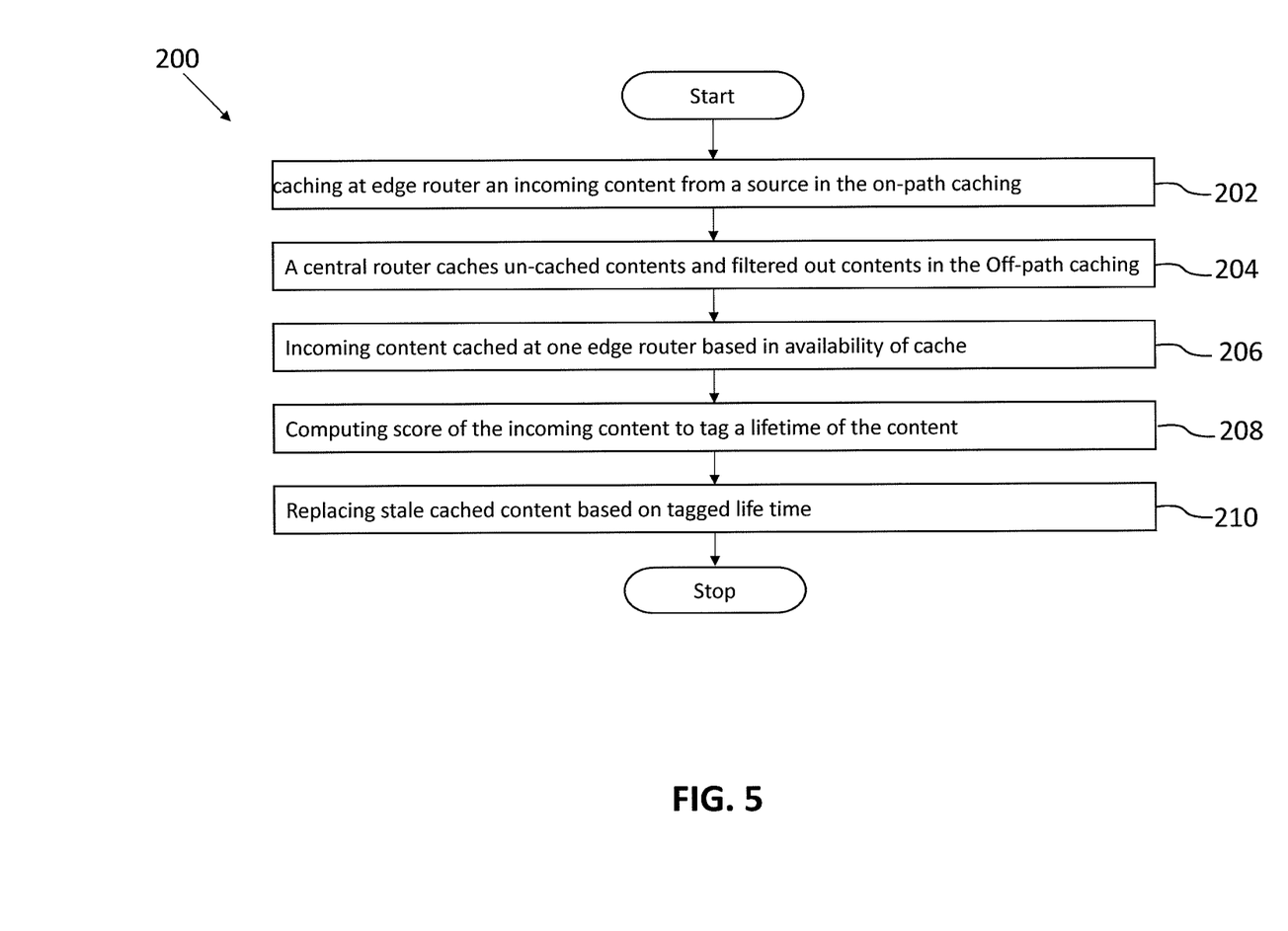
FIG. 5 illustrates a method to improve network performance by co-operative caching content in a multi-router information centric network (ICN) architecture according to an embodiment of the present disclosure

Referring FIG. 5, a method 200 to improve network performance by co-operative caching content in a multi-router information centric network (ICN) architecture. The method comprising on-path caching and off-path caching.

In the preferred embodiment at step 202, in the on-path caching atleast one of a plurality of edge routers of a multi-router network caches an incoming content from a source router in the return path while the content is being served to a user of the multi-router network. The source router of the multi-router network is either a content producer server or at least one router of the multi-router network.

In the preferred embodiment at step 204, in the off-path caching a predefined central router of the multi-router network caches one or more un-cached contents and one or more filtered out staled contents of each of the plurality of edge routers. Wherein the plurality of edge routers of the multi-router network are assisted by the pre-defined central router of the multi-router network. Each of the plurality of edge routers will send information consisting the E[p-951345939 I] and E[d-951345939 I] value of the contents that the plurality of edge routers want to cache in the central router.

In the preferred embodiment at step 206, the incoming content cached at atleast one of the plurality of edge routers of the multi-router network is based on availability of cache of the edge router.

In the preferred embodiment at step 208, the method computes score of the incoming content to cache at each of the plurality of edge routers of the multi-router network, wherein the computed score is used to tag cache lifetime of the content. Further, the computed content score is based on normalized distance between the source router and serving router of the multi-router network and normalized frequency of access of the content. Furthermore, the cache router score comprising of scaled value of rate of requests, diversity index and probability hit at each of the plurality of routers.

In the preferred embodiment at step 210, the method replaces stale cached content of the atleast one of the plurality of edge routers, wherein the replacement is based on the lower cache lifetime of the staled cache and incoming content. Further, the caching of the one or more filtered out staled contents from the plurality of routers and the one or more un-cached contents is based on state information of the plurality of edge routers, cache hit probability of the content and average delay being experienced while submitting a content for caching.

In the preferred embodiment, when the cache router score of the plurality of edge routers is equal, the priority will be based on the average end-to-end delay being observed while serving the requests.

In the preferred embodiment, the state information of the plurality of edge routers include arrival rate and diversity index of the requests for content. The caching of the one or more filtered out staled contents from a plurality of routers is based on a cache router score of each of the plurality of routers.

In another embodiment of the disclosure, in order to solve Eq. (4), a heuristic method is proposed which runs at each ICN edge router independently. In a step of the said method, cache availability is checked for and if available then the new content is cached without replacing the existing contents. Else, based on the content caching score, the router decides whether to replace or not. If the new content does not get cached then that particular content is offloaded to the central router for possible off-path caching. Similarly replaced contents are also offloaded for off-path caching. Note that in case the new content is fetched from the central router, then the edge router does not forward it for off-path caching if it's non-cacheable at the edge router due to low content caching score.

In the preferred embodiment, un-cached and replaced contents of the edge routers are being offloaded to the central router. Apart from these, the central router does not directly gets any other content from the source for caching. In practice, the central router is also of finite cache size. Therefore, the caching mechanism to be used by the central router should be able to decide what to cache when multiple contents are arrived for caching from different edge routers. To achieve this, a framework is proposed in which the edge routers need to pass on their state information in terms of arrival rate and diversity index of requests, cache hit probability being observed and the average delay being experienced while submitting a content for caching.

Figure 4:
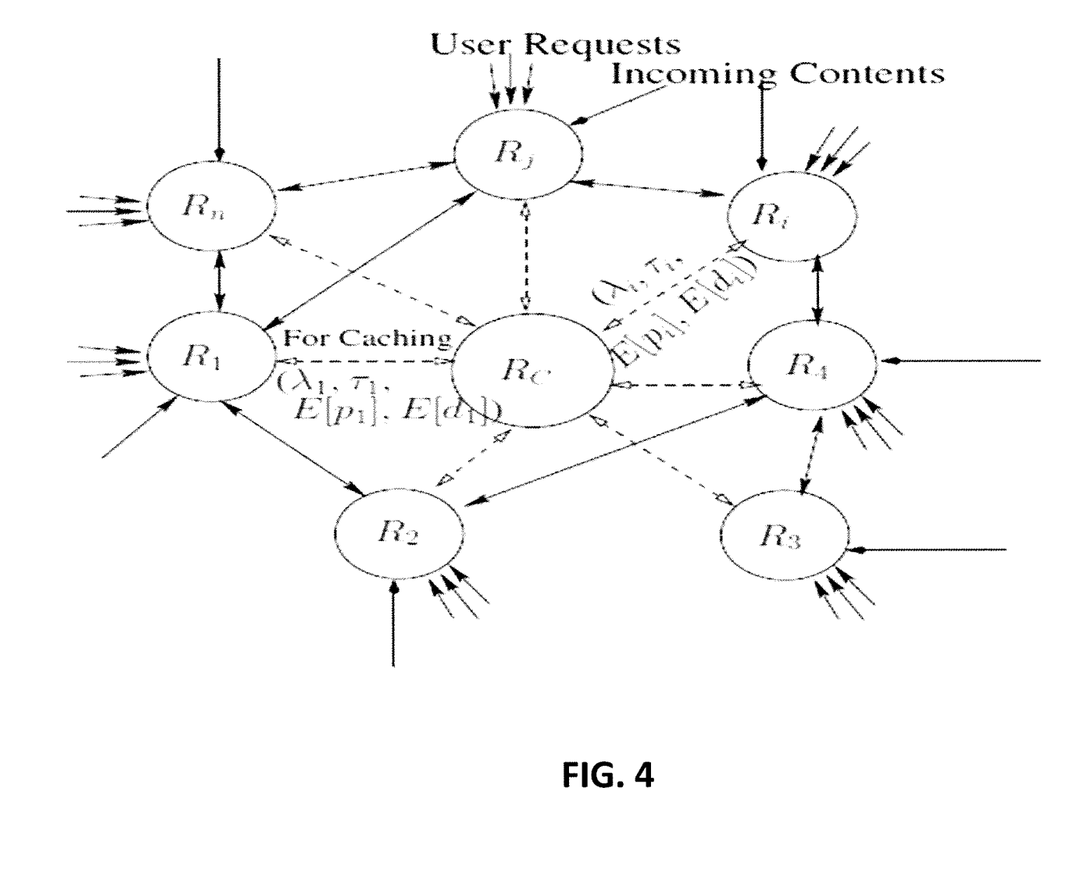
FIG. 4 illustrates a network topology with ICN on-path and off-path caching routers according to an embodiment of the present disclosure.

In another example, wherein disclosure provides that when any router i requests the central router for off-path caching only if its own cache availability $\Delta B_i=0$. FIG. 4 illustrates the off-path caching topology in which $R_1, \ldots, R_n$ are the edge routers and RC is the central routers. Therefore, central router RC receives the following information from all the edge routers.

$$\begin{pmatrix} \lambda_1 & \mathcal{T}_1 & E[p_1] & E[d_1] \\ \lambda_2 & \mathcal{T}_1 & E[p_2] & E[d_2] \\ \lambda_3 & \mathcal{T}_1 & E[p_3] & E[d_3] \\ . & . & . & . \\ . & . & . & . \\ \lambda_i & \mathcal{T}_i & E[p_i] & E[d_i] \\ . & . & . & . \\ . & . & . & . \\ \lambda_n & \mathcal{T}_n & E[p_n] & E[d_n] \end{pmatrix}$$

Each row of this matrix corresponds to the information received from one edge router. These information can be piggy-backed suitably with the ICN data packets. Due to the distributed nature of the network, information received from edge routers are not fully synchronized. Since each row in the above matrix corresponds to the local information of a particular router, getting a global state at the central router is important. Hence, to have an optimal caching at RC, the following optimization problem needs to be solved.

$$\max E[p_C], \quad (5)$$

s.t.

$$E[d_i] \leq \delta \; \forall \; i,$$

$$\Delta B_C \geq 0,$$

Where $E[p_C]$ is the expected probability of hit at RC and $\Delta B_C$ is the cache availability of the central cache router at time instant t. Solution of this can be obtained as follows:

$$\max[E[p_C] - a_i(E[d_i] - \delta)], \; \forall \; i, \Delta B_C \geq 0, \quad (6)$$

Where $a_i$ is a Boolean parameter. $a_i=1$, if the content from the i-th edge router is getting cached at the central router, $a_i=0$, otherwise. To select router i, whose contents can be stored at the central router in the case of simultaneous requests coming from multiple edge routers, cache router score $s_i$ is defined as:

$$s_i = \frac{E[d_i]}{g_i}, \quad (7)$$

Where $g_i$ is the scaled value of rate of requests, diversity index and observed probability of hit at router i. In other words, it is the fraction of non-repetitive requests getting served by any edge router i:

$$g_i = E[p_i] \times \lambda_i \times \tau_i. \quad (8)$$

Central router RC sorts the $s_i$ values associated with each edge router i and caches the content of the router i with the highest $s_i$ value, i.e., $a_i=1$. The central router keeps on caching the contents of the edge routers with descending order of $s_i$ till cache availability. In case, two routers have same $s_i$ values, central router gives priority to the router with higher $E[d_i]$ value for caching such that delay at that router can be minimized.

In another embodiment of the present disclosure, another method is implemented which is employed at the central router. In the preferred method, cache hit is checked for; if the new incoming content from the edge router exists in the cache, then the router score and observed delay associated with the cached content with that of the incoming content is updated. In case there is a cache miss, i.e., if the new content is not available in the central router, cache availability at the central router is checked for. If cache is available, then it can be cached with the attached router score and observed delay. In case there is no cache available, then whether cache replacement can be performed or not needs to be checked. In case the router score associated with the new content is higher than the lowest router score associated with the cached contents, then new content can replace the cached content with lowest router score. However, if the router score values are same, the delay associated is checked for and replaced if the delay associated with the new content is more than that of the cached content. In all other cases the incoming content is dropped. To avoid cache staleness, old contents whose lifetime are expired are dropped. Once cached, the central router needs to update the ICN Manager such that future resolution can be directed to the central router as the potential source. While serving the future requests coming from the central router, it needs to update the frequency of access of the requested content by unity. This is to ensure that any content which is stored at the central router and which is being requested by the edge routers should be cached for a longer period. By doing this, delay profile of the edge routers can be improved.

In another example, to evaluate the performance of the proposed scheme, MATLAB-based simulations with limited ICN functionalities have been conducted. A memory less system in which individual edge routers receive requests following Poisson process with rate $\lambda$ for the existing contents stored in the cache as well as the new incoming contents has been assumed. ICN contents are picked out from a pool of 100 different types of contents stored in a source router outside the campus network. Depending upon the diversity index T selected at a router, ICN contents can be repeatedly requested by the users. Upon receiving requests, the ICN routers check their cached contents; in case of a cache-hit, the routers serve the contents from their caches, else (cache-miss) the contents are served either from the central cache or the original source of the contents. The cache-missed contents can either replace any existing content (cache-miss-replace) or can be forwarded to the central cache router for caching such that future requests for the same content can be served without downloading from the original source. It is to be noted that with Overlay-ICN (O-ION) type of architectural ICN implementation for each caching update (cached or replaced or dropped), the ICN routers need to update the ICN Manager. The ICN Manager is actually the arbitrator and cache miss/hit corresponding to the ICN routers can only be measured at the corresponding ICN Manager.

In the given example, the ICN Manager functionalities with a global function which is capable of name resolution, source finding and keeping the cache updates of the routers attached to it (both the central and edge routers) has been implemented.

In the given example, in order to obtain statistically relevant results, sufficient simulation runs with 1000 different seed values (i.e., different traffic generations) with confidence interval of 2% of the mean value with a confidence level of 95% have been performed. For the simulations, a 5-node network with (both on-path and off-path caching) and without central router (on-path caching only) have been conducted. In the former case, cache size of the edge router are assumed to be of 70 units (no central router) whereas in the latter case the edge routers are assumed to be of 30 units with a central router of 200 units cache size. Therefore, total cache size of both the cases are same (350 units each). It has been further assumed that the ICN contents are of uniform size.

In the given example, a per-content delay and network utilization or cost as the two network parameters have been considered as the two network parameters to measure the system performance with varying request traffic rate ($\lambda$).

Figure 6:
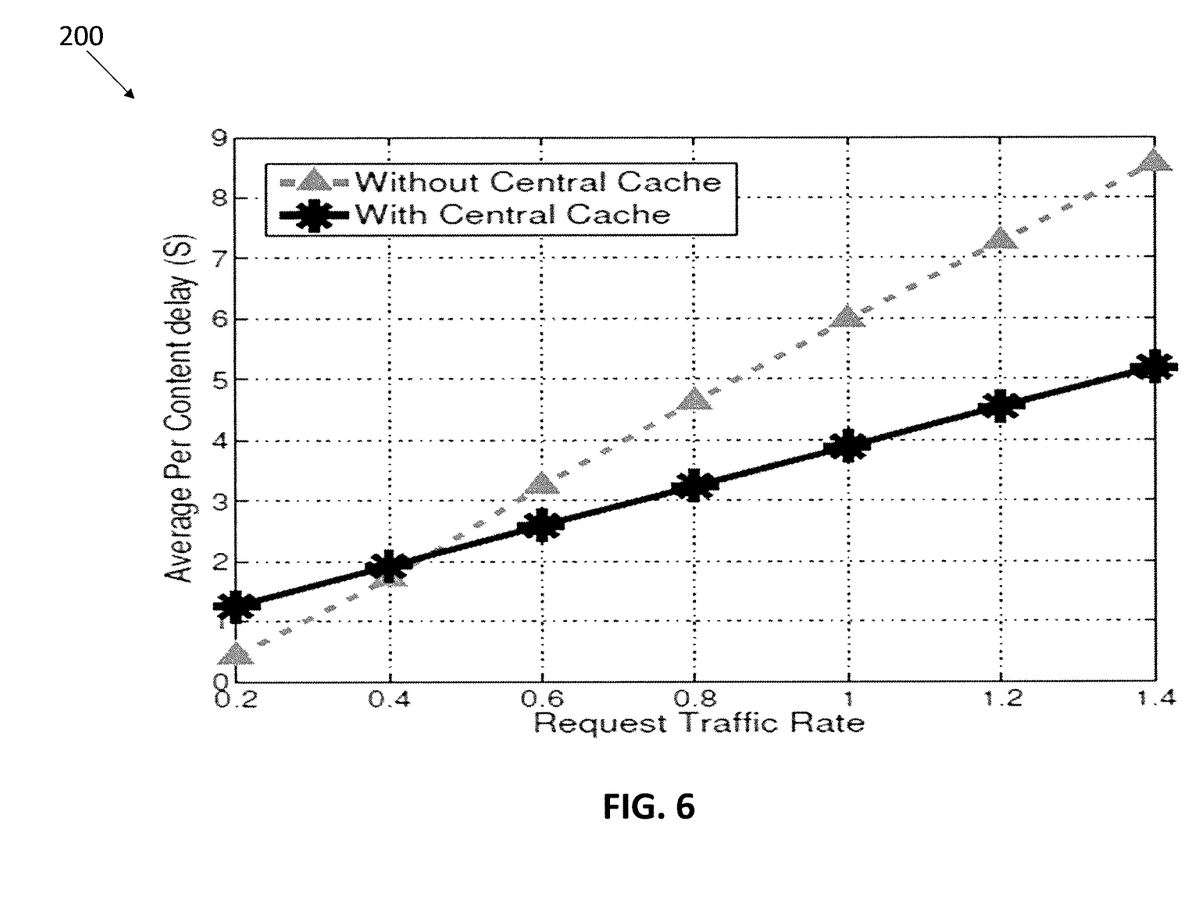
FIG. 6 illustrates the performance analysis of the proposed scheme in terms of average delay according to an embodiment of the present disclosure.

Per-Content Delay signifies how much average delay each ICN content transmission can encounter. With the increase in request traffic rate, more number of requests are missed at the edge routers which in turn get forwarded to the central cache. Therefore, future requests for the same contents are served from the central cache instead of downloading from the distant original source again. Apart from this, cache duplication also gets reduced. This improves the total network consumption and delay significantly. This is illustrated in FIG. 6. Network Utilization or Cost: Considering each ICN data packet transmission in a network link is associated with certain cost, this parameter explains the overall network usage or cost by the campus network. This is illustrated in FIG. 7.

Figure 7:
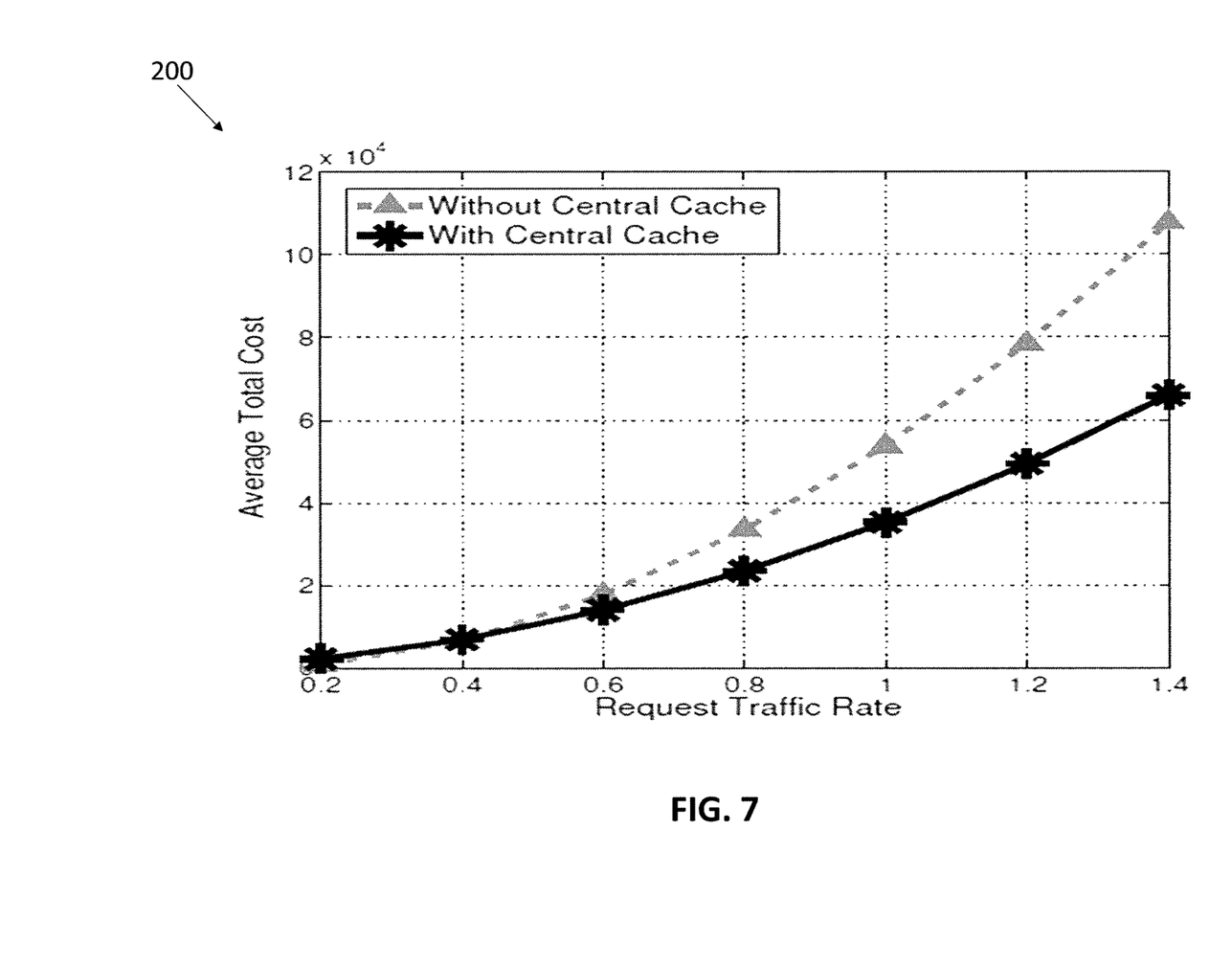
FIG. 7 illustrates the performance analysis of the proposed scheme in terms of average cost which is a function of network usage according to an embodiment of the present disclosure.

As illustrated in FIG. 6 and FIG. 7, it has been observed that with central cache, performance of the campus network is improved significantly. Reduction in cache duplication by the use of the central cache router has also been observed.

In another example, the network performance with different diversity index of the requests has been observed. However, instead of plotting the performance over diversity index, plotting has been done with respect to cache miss percentage. Generated requests are exactly identical to the cached contents when the cache miss percentage is zero (i.e., $\tau=0$) and generated requests are completely diverge from the cached contents when the cache miss percentage is 100 (i.e., $\tau=1$).

Figure 8:
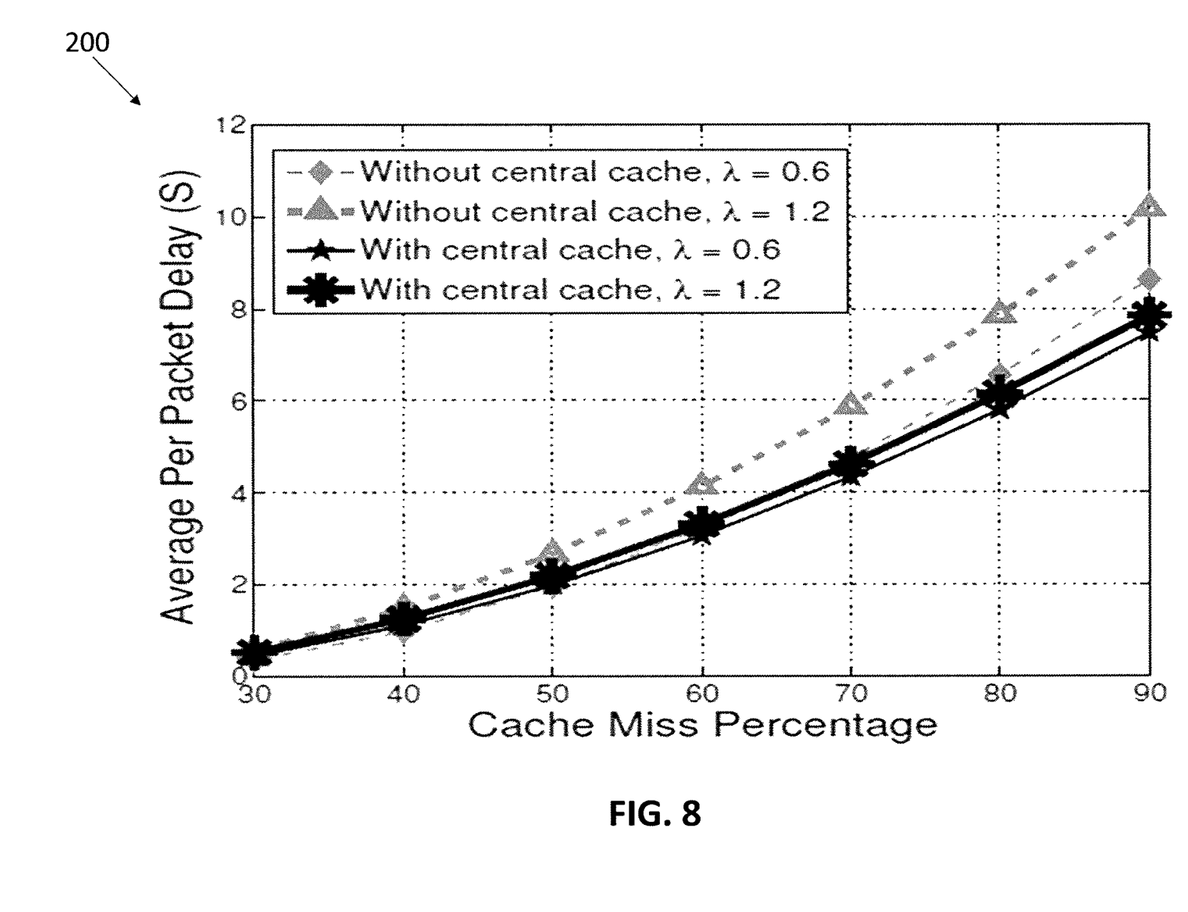
FIG. 8 illustrates the performance of the system in terms of delay with changing cache miss percentage at different values of request traffic rate according to an embodiment of the present disclosure.
Figure 9:
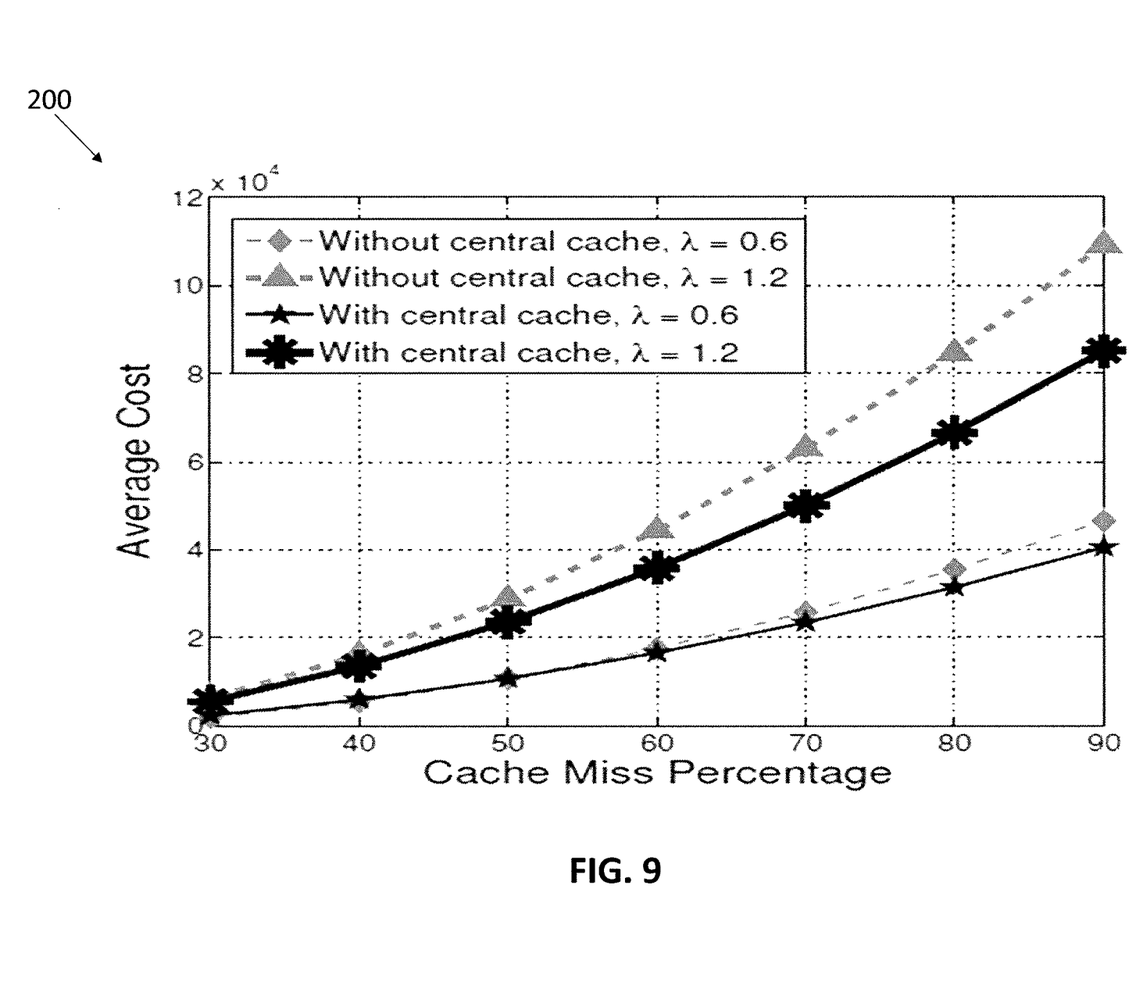
FIG. 9 illustrates the performance of the system in terms of cost or network usage with changing cache miss percentage at different values of request traffic rate according to an embodiment of the present disclosure.

Referring FIG. 8 and FIG. 9, the performance of the system with changing cache miss percentage at different values of request traffic rate $\lambda$ has been observed. From FIG. 8, it has been observed that the delay gets affected with increase in cache miss percentage or diversity index. In addition to this, with increase in request rate, average delay also increases. However, as expected average delay is reduced with central cache router in place as compared to that without the central cache router. Similarly, FIG. 9 depicts that as the cache miss percentage increases, the cost of the system also increases. Moreover, with high data traffic flow, higher number of misses occur which costs the system even more. It is to be noted that the delay performance (FIG. 8) degrades with higher request traffic rate with or without a central cache, it is important to mention that delay performance degradation is much lower with a central cache even under diverse content requests, and especially so under heavy request traffic conditions. Similarly, average costs (FIG. 9) are lower for diverse and heavy traffic situations with a central cache router. In all it proves that having a central cache, improves the performance of router clusters such as in a campus. While these results are for a typical campus, similar results can be expected in larger Internet by clustering a group of routers around some criterion such as physical location and then allocating an off-path cache router at a nearby location.

Although implementations of system and method for integrating data from plurality of sources and to present a comprehensive view to the consuming applications, it is to be understood that the specific features and methods are disclosed as examples of implementations for integrating data from plurality of sources and to present a comprehensive view to the consuming applications.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method to improve network performance by co-operative caching content in a multi-router information centric network (ICN) architecture, the method comprising:
   receiving, at an edge router of a plurality of edge routers, a request for content from a plurality of end users;
   checking a local cache, by the edge router, for availability of the content;
   serving, by the edge router, the request if the content is available and forwarding, by the edge router, the request to an ICN manager if the content is not available;
   forwarding the request, by an ICN manager, to a source router, the source router being an original source of the content or a nearest intermediate router having the content;
   caching, by an intermediate router and the edge router present in a path from the source router to an end user, an incoming content received from the source router, based on availability of a respective local cache to perform on-path caching;
   computing, by the edge router present in the path from the source router to the end user, a score of the incoming content to cache, wherein the computed score is used to tag cache lifetime of the content;
   replacing, by the intermediate router and the edge router, a stale cached content of the respective local cache with the incoming content upon finding that the respective local cache is full and updating the ICN Manager with each caching update by a central router; wherein the stale cached content is replaced based on lower cache lifetime of the staled cache and incoming content; and
   caching, by the central router, one or more un-cached contents and the stale content of the intermediate router and the edge router to perform off-path caching.

2. The method claimed in claim 1, further comprising:
   the plurality of edge routers of the multi-router network are assisted by the central router of the multi-router network.

3. The method claimed in claim 1, wherein the computed content score is based on normalized distance between the source router and serving router of the multi-router network and normalized frequency of access of the content.

4. The method claimed in claim 1, wherein the caching of the staled contents from the plurality of routers and the one or more un-cached contents is based on state information of the plurality of edge routers, cache hit probability of the content and average delay being experienced while submitting a content for caching.

5. The method claimed in claim 4, wherein the state information of the plurality of edge routers include an arrival rate of the requests from the user and a diversity index of the requests for content.

6. The method claimed in claim 4, wherein the caching of the one or more filtered out staled contents from a plurality of routers is based on a cache router score of each of the plurality of routers.

7. The method claimed in claim 6, wherein the cache router score comprising of scaled value of rate of requests, diversity index and probability hit at each of the plurality of routers.

8. The method claimed in claim 6, wherein when the cache router score of the plurality of edge routers is equal, the priority will be based on the average end-to-end delay being observed while serving the requests.

9. The method claimed in claim 1, wherein the source router of the multi-router network is either a content producer server or at least one router of the multi-router network.

10. The method claimed in claim 1, wherein each of the plurality of edge routers sends information comprising value of average probability hit of the contents and value of end-to-end delay being observed while serving the requests of the contents.

11. A system for improving network performance by co-operative caching content in a multi-router information centric network (ICN) architecture, the system comprising:
   a plurality of edge routers of the multi-router network;
      wherein each of the plurality of edge routers is configured to:
         receiving a request for content from a plurality of end users;
         checking a local cache for the availability of the content;
         serving the request if the content is available and forwarding the request to an ICN manager if the content is not available;
         caching an incoming content received from a source router, being an original source or a nearest intermediate router having the content, when present on a path from source router to an end user, based on availability of the local cache to perform on-path caching; and replacing a stale contents of the local cache with the incoming content upon finding that the local cache is full and updating the ICN Manager with each caching update by a central router;
   the ICN manager and/or ICN resolver to forward the request of content, to the source router;
   a plurality of intermediate routers present in the path from the source router to the end user to cache the content received from the source router based on availability of the local cache to perform on-path caching;
   means for computing score of the incoming content to cache at each of plurality of edge routers of the multi-router network, wherein the computed score is used to tag cache lifetime of the content;
   means for replacing stale cached content of the at least one of plurality of edge routers, wherein the replacement is based on the lower cache lifetime of the staled cached content and incoming content; and
   the central router of the multi-router network to cache one or more contents and one or more stale contents of each of the intermediate routers and edge routers to perform off-path caching.

* * * * *